June 15, 1954
P. A. GROBEY
2,681,229
DIAPHRAGM CHUCK
Filed Feb. 4, 1952
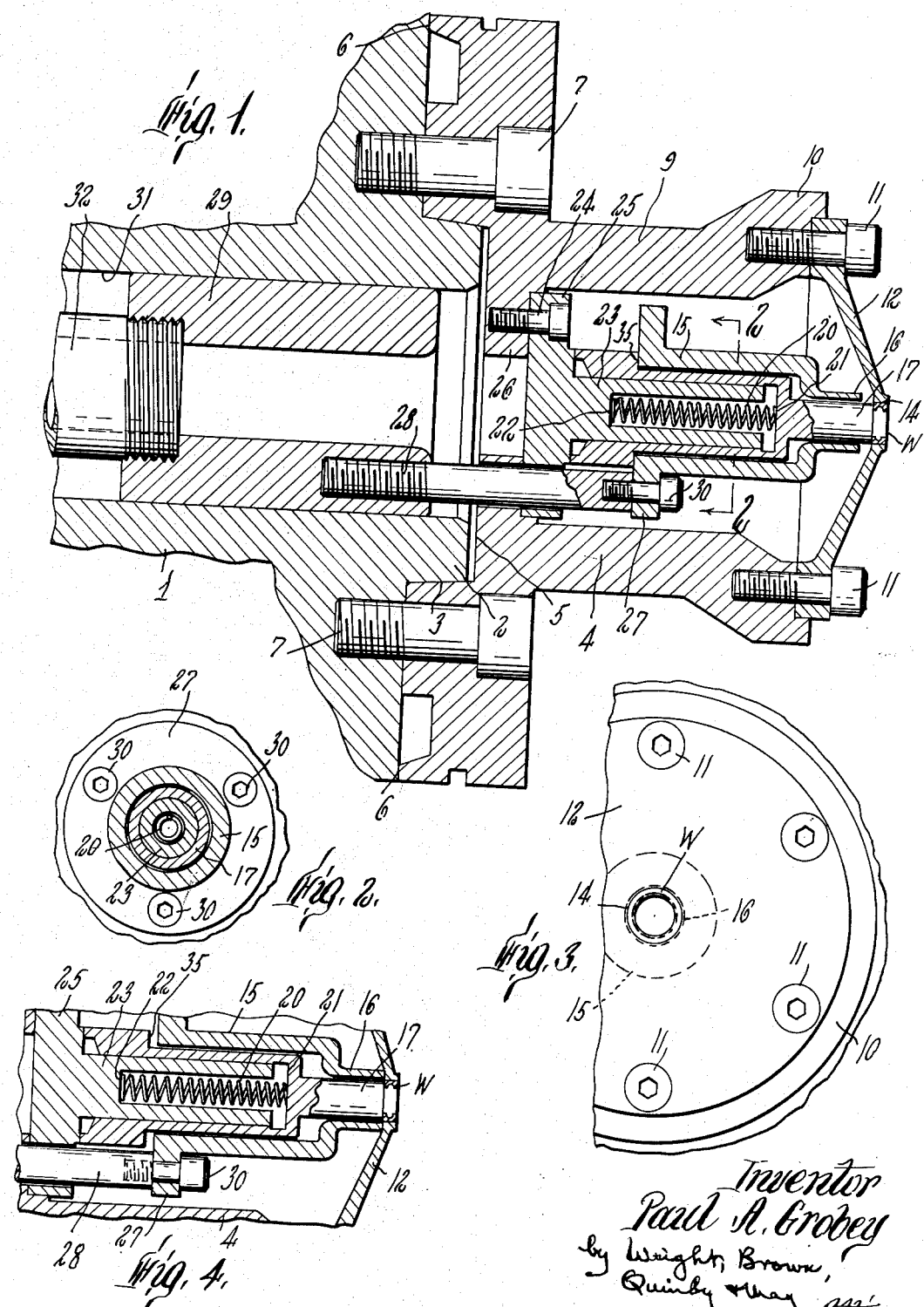
Inventor
Paul A. Grobey
by Wright, Brown,
Quinby & May
Attys.

Patented June 15, 1954

2,681,229

UNITED STATES PATENT OFFICE 2,681,229

DIAPHRAGM CHUCK

Paul A. Grobey, Springfield, Vt., assignor to Bryant Chucking Grinder Company, Springfield, Vt., a corporation of Vermont Application February 4, 1952, Serial No. 269,855

5 Claims. (Cl. 279—102)

This invention relates to chucks, and more particularly for holding round tubular parts for internal machining, particularly grinding, and has for an object to insure the highest accuracy in roundness of work and in concentricity between the outside surface and the bore.

For a complete understanding of this invention, reference may be had to the accompanying drawings in which Figure 1 is a central longitudinal sectional view through a closed chuck embodying the invention and including adjacent parts of the spindle to which the chuck is fixed.

Figure 2 is a detail sectional view on line 2—2 of Figure 1.

Figure 3 is a fragmentary right hand or front end elevation of the parts shown in Figure 1.

Figure 4 is a view similar to a portion of Figure 1, but showing the chuck about to be opened or just closed.

Referring to the drawings, at 1 is indicated a rotary work spindle having at its forward end a nose to which the chuck may be attached. As shown this nose is of the well known standard type, having a central tubular extension 2 provided with a tapered wall 3. The chuck comprises a body 4 having a central recessed portion 5 which fits over the extension 2 and an annular rear face 6 which abuts against the end face of the spindle nose. This body may be secured to the spindle as by the screws 7.

The chuck body comprises a tubular portion 9 which extends forwardly in coaxial alinement with the spindle, and has at its forward end an enlarged diameter portion 10 to which is secured, as by bolts 11, the outer marginal portion of a diaphragm 12. This diaphragm, as shown, tapers in thickness, its thicker portion being adjacent to its outer margin, and it is conical in shape with its apex projecting away from the spindle 1. Through this apex is provided a hole 14 normally of sufficiently small size to grip a tubular work piece W which may be placed therein with its central portion free for machining operations, such, for example, as grinding. Between the hole 14 and the holes for the bolts 11 this diaphragm may be imperforate. As shown this work piece is the external ring of a ball bearing.

Positioned rearwardly of the diaphragm is a sleeve 15 having a reduced diameter forward tubular portion 16 enveloping a work ejector plunger 17 and which is of a diameter to engage against the back face of the diaphragm nearer to the spindle adjacent to the central opening within which the work piece W is positioned. By pressing this member 15 against the rear face of the diaphragm, the diaphragm may be distorted and the hole for the work piece stretched sufficiently for the work piece to be released, so that it can be removed and replaced by another work piece to be machined on its inner face. This stretching or expanding of the hole or bore is of very small amount but it is sufficient to release the work piece. The hole in the diaphragm when the diaphragm is in normal unstrained condition is only a few 1/10000 of an inch smaller than the outside diameter of the work piece to be machined.

The work ejector 17 has its end portion slightly smaller than the normal size of the hole through the diaphragm and is in position to engage the rear face of the work piece and eject it when the hole has been stretched sufficiently to free the work piece therefrom. This ejector 17 is normally pressed toward ejecting position by a spring 20 housed thereby and which reacts between its recessed end face 21 and the base 22 of the socket in a guide member 23 which is secured to the body 4 as by screws 24 which pass through a flange 25 of the guide member 23 and engage in a mating flange 26 of the body.

The member 15 is connected through two or more actuating rods 28 secured to an outwardly extending flange 27 thereof by screws 30, to a sleeve 29. These rods 28 are threaded into the sleeve 29 which is slidably guided for axial motion within the central bore 31 of the spindle. The sleeve 29 may be connected to an actuating sleeve 32 as by being threaded thereto, this sleeve 32 extending through the length of the spindle and being accessible for axial motion from its opposite end where it may be actuated by any suitable means well known in the art. When the member 15 is moved to engage and stretch the central portion of the diaphragm, the ejector 17 is allowed to be projected to engage and eject the work as soon as it has been freed from the diaphragm by enlargement of the hole 14, while retraction of the member 15, which allows the diaphragm to return to normal work-gripping positions, causes the rear face of the flange 27 to engage a shoulder 35 on the ejector 17 and pull this ejector away from the diaphragm.

From the foregoing description of an embodiment of this invention it should be evident to those skilled in the art that various changes and modifications may be made without departing from its spirit or scope.

I claim:

1. A chuck comprising, a tubular body for securement coaxially to a spindle, a diaphragm secured adjacent to its margin to said body and having a hole coaxial with said body of a normal size to grip a work piece inserted therein, and means normally supported by said body and engageable with a face of said diaphragm adjacent to said hole and movable to deflect said diaphragm lengthwise of the axis of said body and increasing the diameter of said hole sufficiently to free such work piece.

2. A chuck as described in claim 1, in which the diaphragm is conical and faces outwardly with respect to said spindle, and said deflecting means engages the concave face of said diaphragm.

3. A chuck comprising a tubular body for coaxial securement to one end of a hollow spindle, a conical diaphragm secured about its outer margin coaxially to said body and with its apex extending outwardly from said body away from said spindle, said apex having a hole therethrough normally of a size to grip a work piece therein, a guide member secured coaxially in said body, a work ejector slidably guided by said guide member and having an outer end positioned to engage the inner end nearer to said spindle of a work piece in said hole, a tubular release member enveloping said ejector and having its outer end positioned to engage on the inner face of said diaphragm nearer to said spindle adjacent to said hole, a member extending through said spindle and secured to said release member and by axial motion of which said release member may be pressed against said diaphragm and said diaphragm forced outwardly away from said spindle adjacent to said hole to enlarge said hole and free a work piece therein, and a spring reacting between said guide member and ejector for pushing said ejector against and ejecting the work from said hole when said hole has been so enlarged.

4. A chuck comprising a tubular body for coaxial securement to an end of a hollow spindle, a conical diaphragm secured about its outer margin coaxially to said body and with its apex extending outwardly from said body, said apex having a hole therethrough normally of a size to grip a work piece therein, a guide member secured coaxially in said body, a work ejector slidably guided by said guide member and having an outer end positioned to engage the inner end of a work piece in said hole, a tubular release member enveloping said ejector and having its outer end positioned to engage on the inner face of said diaphragm toward said spindle adjacent to said hole, a member extending through said spindle and secured to said release member and by motion of which axially of said spindle said release member may be pressed against said diaphragm and said diaphragm forced outwardly adjacent to said hole to enlarge said hole and free a work piece therein, and a spring reacting between said guide member and ejector for pushing said ejector against and ejecting the work from said hole when said hole has been so enlarged, said release member and ejector having parts cooperating to withdraw said ejector by withdrawal of said release member.

5. A chuck comprising a tubular body for securement to an end of a spindle, a conical diaphragm tapering in thickness between its margin and central portion, being thicker adjacent to said margin, said diaphragm being secured adjacent to its margin to said body with its apex presented outwardly from said spindle and having a work piece receiving hole therethrough at its apex, and means engageable against the inner face of said diaphragm adjacent to said hole and actuable to force the central portion of said diaphragm axially of said body outwardly away from said spindle to thereby temporarily enlarge said hole to facilitate placing and removal of a work piece with respect thereto.

References Cited in the file of this patent

UNITED STATES PATENTS

| Number | Name | Date |
| --- | --- | --- |
| 1,941,025 | Stein | Dec. 26, 1933 |
| 2,334,046 | Tinnerman | Nov. 9, 1943 |
| 2,366,114 | Kost | Dec. 26, 1944 |